United States Patent
Hanneke

(10) Patent No.: US 10,767,530 B2
(45) Date of Patent: Sep. 8, 2020

(54) HEAT SINK FOR AN INJECTION/METERING VALVE

(71) Applicant: Robert Bosch GmbH, Stuttgart (DE)

(72) Inventor: Juergen Hanneke, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/306,024

(22) PCT Filed: May 3, 2017

(86) PCT No.: PCT/EP2017/060466
§ 371 (c)(1),
(2) Date: Nov. 30, 2018

(87) PCT Pub. No.: WO2017/207196
PCT Pub. Date: Dec. 7, 2017

(65) Prior Publication Data
US 2019/0292965 A1 Sep. 26, 2019

(30) Foreign Application Priority Data
May 30, 2016 (DE) .......... 10 2016 209 269

(51) Int. Cl.
*F01N 3/00* (2006.01)
*F01N 3/20* (2006.01)

(52) U.S. Cl.
CPC ........ *F01N 3/2066* (2013.01); *F01N 2610/02* (2013.01); *F01N 2610/11* (2013.01); *F01N 2610/1453* (2013.01); *Y02T 10/24* (2013.01)

(58) Field of Classification Search
USPC ........................................... 60/286
See application file for complete search history.

(56) References Cited

U.S. PATENT DOCUMENTS 6,279,603 B1 * 8/2001 Czarnik ............. B01D 53/8625
123/472
6,481,641 B1 * 11/2002 Mieney ................... B01J 19/26
239/128
(Continued)

FOREIGN PATENT DOCUMENTS

DE 102010051656 5/2012
DE 102013205309 10/2014
(Continued)

OTHER PUBLICATIONS

International Search Report for Application No. PCT/EP2017/060466 dated Jun. 23, 2017 (English Translation, 3 pages).

*Primary Examiner* — Jason D Shanske
(74) *Attorney, Agent, or Firm* — Michael Best & Friedrich LLP

(57) ABSTRACT

A heat sink (2) for an injection/metering valve (4) has a coolant chamber (8) which is designed for receiving a fluid coolant. The coolant chamber (8) has at least one inlet (14) for supplying the coolant and at least one outlet (16) for removing the coolant. The at least one inlet (14) and/or outlet (16) has a pipe segment (20, 22) which extends with one end into the coolant chamber (8). The coolant-chamber-side end of the pipe segment (20, 22) is bevelled, and therefore the coolant-chamber-side end of the pipe segment (20, 22) is in contact at at least one point along its circumference with a baffle (12) arranged in the coolant chamber (8), and the end of the pipe segment (20, 22) is spaced apart at another point along its circumference from the baffle (12).

11 Claims, 2 Drawing Sheets

(56) References Cited

U.S. PATENT DOCUMENTS

| | | | | |
|---|---|---|---|---|
| 6,539,708 B1* | 4/2003 | Hofmann | ............... | B01D 53/90 |
| | | | | 60/286 |
| 9,745,880 B2* | 8/2017 | Haeberer | .............. | F01N 3/2066 |
| 10,100,692 B2* | 10/2018 | Seitz | .................... | F01N 3/2066 |
| 2013/0228231 A1* | 9/2013 | Nagel | ................... | F01N 3/2066 |
| | | | | 137/334 |
| 2014/0054394 A1* | 2/2014 | Bugos | ....................... | F01N 3/10 |
| | | | | 239/132.3 |
| 2016/0305298 A1* | 10/2016 | Murst | .................. | F01N 3/2066 |

FOREIGN PATENT DOCUMENTS

| | | | | |
|---|---|---|---|---|
| WO | WO-2012049175 A1 * | 4/2012 | ........... | F02M 53/043 |
| WO | 2013068288 | 5/2013 | | |

* cited by examiner

HEAT SINK FOR AN INJECTION/METERING VALVE

BACKGROUND OF THE INVENTION

The invention relates to a heat sink for an injection or metering valve.

In systems for exhaust gas aftertreatment, injection or metering valves are used to inject a fluid reducing agent, e.g. an aqueous urea solution ("AdBlue"®), into the exhaust line of an internal combustion engine, in particular of a diesel engine. Here, the injection or metering valves are arranged directly on the exhaust line and are therefore exposed to high temperatures during operation.

In order to avoid damage to the injection/metering valves and to ensure reliable operation, the injection/metering valves are often provided with heat sinks, through which a fluid coolant flows in order to cool the injection/metering valve.

Production tolerances of the heat sinks lead to different flow cross sections, resulting in a difference in the cooling behavior of the heat sinks.

SUMMARY OF THE INVENTION

It is an object of the invention to make available heat sinks for injection/metering valves which have a cooling behavior that is as constant as possible.

According to one illustrative embodiment of the invention, a heat sink for an injection/metering valve has a coolant chamber, which is designed to receive a fluid coolant. The coolant chamber has at least one inlet for feeding the coolant into the coolant chamber and at least one outlet for discharging the coolant from the coolant chamber. In this arrangement, the inlet and/or outlet has a pipe segment, one end of which extends into the coolant chamber.

The coolant-chamber end of the pipe segment is beveled, and therefore the coolant-chamber end of the pipe segment is in contact at at least one point along its end-face circumference with a baffle arranged in the coolant chamber, and the end of the pipe segment is arranged at a distance from the baffle at another point along its end-face circumference.

The contact point at which the end of the pipe segment touches the baffle and the angle of the beveled end of the pipe segment create a defined geometry with small tolerances. Heat sinks which are designed in accordance with illustrative embodiments of the invention therefore have a very constant cooling behavior.

The invention also comprises an injection/metering valve having a heat sink according to the invention, as well as an exhaust line of an internal combustion engine on which an injection/metering valve of this kind is mounted in order to inject a reducing agent into the exhaust line.

In one embodiment, the baffle extends substantially at a right angle to the pipe segment. In this way, a precise geometry can be created, and the choice of angle at which the end of the pipe segment is beveled can be used to set a restricting effect of the inlet and/or of the outlet to a desired value with great accuracy.

In one embodiment, the heat sink has a receptacle for an injection/metering valve which is designed in such a way that the baffle extends substantially parallel to an injection/metering valve arranged in the receptacle. In this way, particularly uniform cooling of the injection/metering valve can be achieved.

In one embodiment, the coolant chamber is of substantially rotationally symmetrical design around the axis of an injection/metering valve arranged in the receptacle. A heat sink of rotationally symmetrical design can be produced in a particularly simple and economical manner.

In one embodiment, an axis of the pipe segment is aligned substantially at a right angle to an injection/metering valve arranged in the receptacle. In this way, it is possible to create a precise geometry, and the choice of angle at which the end of the pipe segment is beveled can be used to set the restricting effect of the inlet and/or of the outlet precisely to a desired value.

In one embodiment, the end face of the pipe segment is beveled at an angle $\alpha$, $7°<\alpha<26°$. Such an angle has proved to be particularly suitable for achieving the desired restricting effect.

In one embodiment, the angle $\alpha_{zu}$ of the pipe segment of the inlet is smaller than the angle $\alpha_{ab}$ of the pipe segment of the outlet. In this way, a sufficient coolant flow and hence sufficient cooling of the injection/metering valve can be achieved.

For example, the end face of the pipe segment of the inlet can be beveled at an angle $\alpha_{zu}$, $7°<\alpha_{zu}<25°$, while the end face of the pipe segment of the outlet is beveled at an angle $\alpha_{ab}$, $8°<\alpha_{ab}<26°$.

In one embodiment, the outlet is arranged opposite the inlet. In particular, the outlet is arranged opposite the inlet at an angle of 180° along the outer circumference of the heat sink. In this way, complete flow of coolant through the coolant chamber can be achieved.

DETAILED DESCRIPTION

Figure 1:
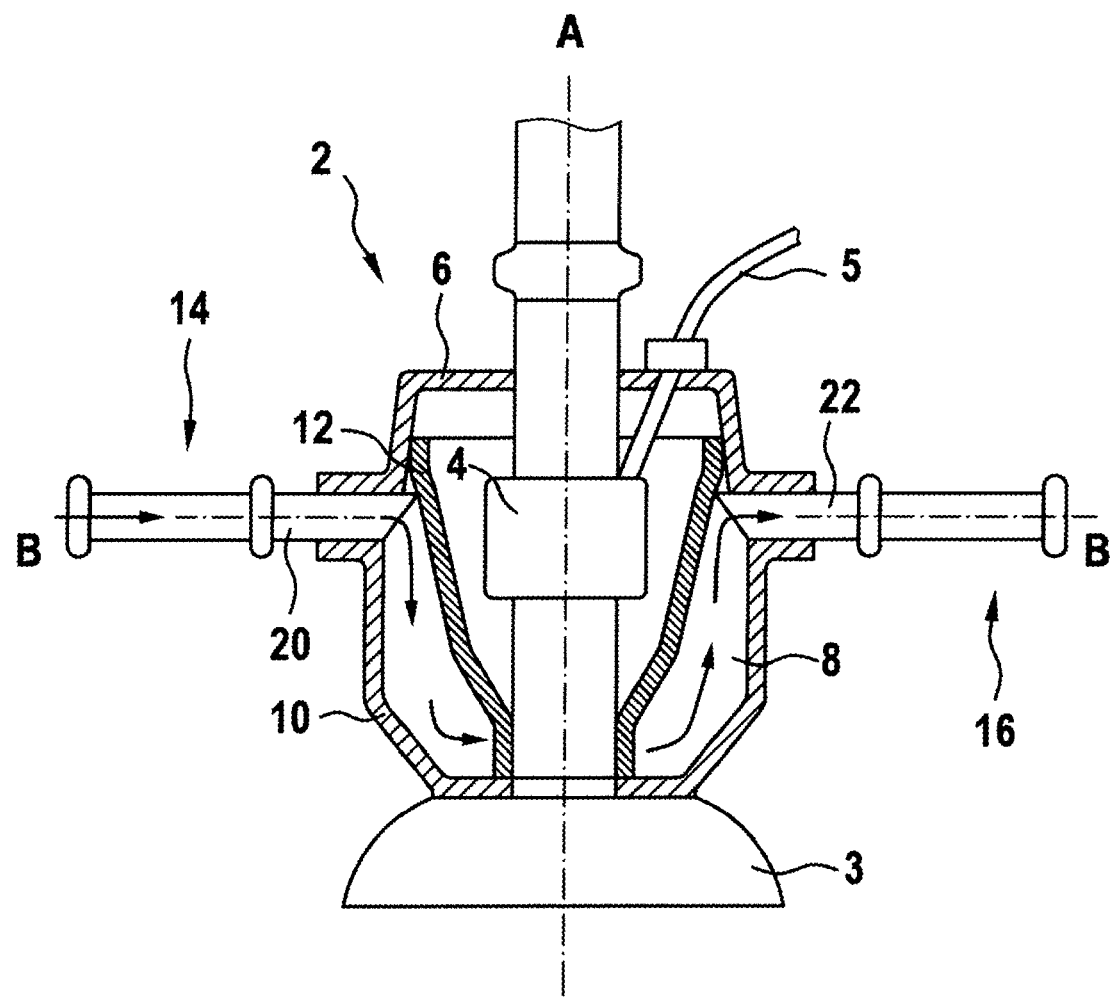
FIG. 1 shows a schematic section through a heat sink according to one illustrative embodiment of the invention.

FIG. 1 shows a schematic section through a heat sink 2 having an injection/metering valve 4 according to one illustrative embodiment of the invention.

The heat sink 2 is arranged on an exhaust line 3 of an exhaust system of an internal combustion engine (not shown).

The heat sink 2 has a housing 6, which is formed in a substantially rotationally symmetrical manner around the axis A of the injection/metering valve 4 and in which a coolant chamber 8 is formed. The coolant chamber 8 is delimited on the outside by the wall 10 of the housing 6. At least one baffle 12 is arranged in the coolant chamber 8 and, in a region close to the exhaust line, which is illustrated in the lower part of FIG. 1, adjoins the outer circumference of the injection/metering valve 4.

An electric lead 5 for controlling the injection/metering valve 4 is passed into the interior of the housing 6 through a fluidtightly sealed opening in the housing 6.

Opening into the coolant chamber 8 are at least one inlet 14 for feeding the coolant into the coolant chamber 8 and at least one outlet 16 for discharging the coolant from the coolant chamber 8. The outlet 16 is arranged opposite the inlet 14, for example, i.e. is offset by 180° along the circumference of the housing 6. This has the effect that the coolant flows through the entire coolant chamber 8.

The inlet 14 and the outlet 16 each have a cylindrical pipe segment 20, 22, the axis B of which is in each case aligned substantially at a right angle to the axis A of the injection/metering valve 4. An end of each pipe segment 20, 22 which faces the injection/metering valve 4 extends into the coolant chamber 8 in such a way that the end facing the injection/metering valve 4 is at least partially in contact with the baffle 12. In this region, the baffle 12 is aligned virtually parallel to the axis A of the injection/metering valve 4, i.e. substantially at a right angle to the axis B of the pipe segment 20, 22.

Figure 2:
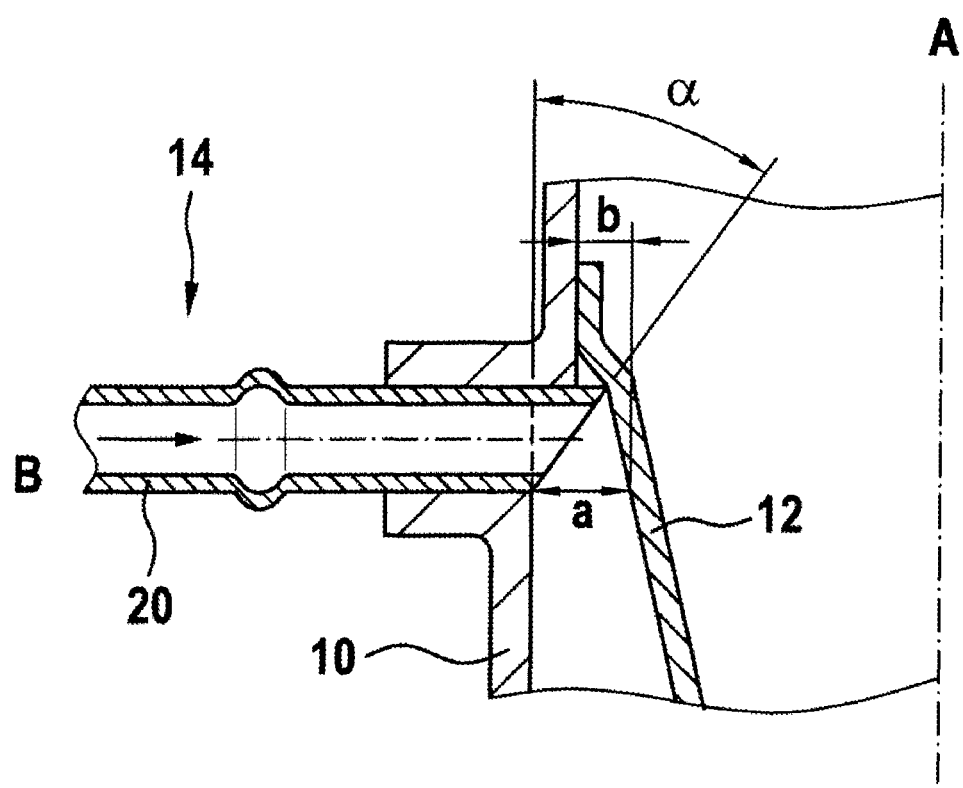
FIG. 2 shows an enlarged sectional illustration of an inlet into a coolant chamber formed in the heat sink.

FIG. 2 shows the end region of the pipe segment 20 of the inlet 14 which adjoins the baffle 12 in an enlarged sectional illustration.

That end face of the pipe segment 20 which faces the baffle 12 is beveled, with the result that the upper region of the pipe segment 20 adjoins the baffle 12, which serves as a stop for the pipe segment 20 during assembly, and the lower region thereof is spaced apart from the baffle 12. That end face of the pipe segment 20 of the inlet 14 which faces the baffle 12 can be beveled, in particular at an angle $7°<\alpha<25°$, with the result that the lower end of the pipe segment 20 is arranged at a distance a of from 2 to 7 mm from the baffle 12.

Through the choice of the angle $\alpha$ at which the end face of the pipe segment 20 is beveled or the distance a between the lower region of the end face of the pipe segment 20 and the baffle 12, it is possible to set a restricting effect: the smaller the angle $\alpha$ and hence the distance a, the greater is the restricting effect. As an alternative or in addition, the restricting effect can be regulated by the shape and arrangement of the baffle 12, e.g. by varying the distance b between the baffle 12 and the wall 10 of the housing 6.

The pipe segment 22 of the outlet 16 can be of corresponding design.

In order to ensure a sufficient coolant flow through the coolant chamber 8, the angle $\alpha_{zu}$ of the pipe segment 20 of the inlet 14 is generally around 2° smaller than the angle $\alpha_{ab}$ of the pipe segment 22 of the outlet 16.

In particular, the end face of the pipe segment 22 of the outlet 16 can be beveled at an angle $\alpha_{ab}$, $8°<\alpha_{ab}<26°$.

The invention claimed is:

1. A heat sink (2) for an injection/metering valve (4) comprising
   a coolant chamber (8), which is configured to receive a fluid coolant, and
   a baffle (12) arranged in the coolant chamber (8);
   wherein the coolant chamber (8) has at least one inlet (14) for feeding in the coolant and at least one outlet (16) for discharging the coolant; and
   wherein the at least one inlet (14) and/or the at least one outlet (16) has a pipe segment (20, 22), a coolant-chamber end of which extends into the coolant chamber (8);
   characterized in that the coolant-chamber end of the pipe segment (20, 22) is beveled, and therefore the coolant-chamber end of the pipe segment (20, 22) is in contact at at least one point along a circumference of the coolant-chamber end with the baffle, and the coolant-chamber end of the pipe segment (20, 22) is spaced apart at another point along the circumference from the baffle (12).

2. The heat sink (2) as claimed in claim 1, wherein the baffle (12) extends substantially at a right angle to the pipe segment (20, 22).

3. The heat sink (2) as claimed in claim 1, wherein the heat sink (2) is configured such that the baffle (12) extends substantially parallel to the injection/metering valve (4) arranged in the heat sink (2).

4. The heat sink (2) as claimed in claim 2, wherein the coolant chamber (8) is of substantially rotationally symmetrical design around the axis (A) of the injection/metering valve (4) arranged in the heat sink (2).

5. The heat sink (2) as claimed in claim 2, wherein the pipe segment (20, 22) is of substantially rotationally symmetrical design around an axis (B), which is aligned substantially at a right angle to the axis (A) of the injection/metering valve (4) arranged in the heat sink (2).

6. The heat sink (2) as claimed in claim 1, wherein the coolant chamber end of the pipe segment (20, 22) is beveled at an angle $\alpha$, $7°<\alpha<26°$.

7. The heat sink (2) as claimed in claim 1, wherein both of the at least one inlet (14) and the at least one outlet (16) have a pipe segment (20, 22) with a coolant-chamber end extending into the coolant chamber (8), and wherein the coolant chamber end of the pipe segment (20) of the at least one inlet (14) is beveled at an angle $\alpha$ that is smaller than an angle $\alpha$ at which the coolant chamber end of the pipe segment (22) of the at least one outlet (16) is beveled.

8. The heat sink (2) as claimed in claim 1, wherein the at least one outlet (16) is arranged opposite the at least one inlet (14).

9. An injection/metering valve (4) having the heat sink (2) as claimed in claim 1.

10. An exhaust line (3) having the injection/metering valve (4) as claimed in claim 9, wherein the injection/metering valve (4) is configured to inject a reducing agent into the exhaust line (3).

11. A heat sink (2) for an injection/metering valve (4) comprising
    a coolant chamber;
    a baffle (12) arranged in the coolant chamber (8);
    an inlet pipe segment having a coolant-chamber end of the inlet pipe segment that extends into the coolant chamber to provide a fluid coolant to the coolant chamber, wherein the coolant-chamber end of the inlet pipe segment (20) is beveled such that the coolant-chamber end of the inlet pipe segment (20) is in contact with the baffle at at least one point along a circumference of the coolant-chamber end of the inlet pipe segment, and the coolant-chamber end of the inlet pipe segment (20) is spaced apart from the baffle at another point along the circumference of the coolant-chamber end of the inlet pipe segment; and
    an outlet pipe segment having a coolant-chamber end of the outlet pipe segment that extends into the coolant chamber (8) to discharge the fluid coolant from the coolant chamber, wherein the coolant-chamber end of the outlet pipe segment (22) is beveled such that the coolant-chamber end of the outlet pipe segment (22) is in contact with the baffle at at least one point along a circumference of the coolant-chamber end of the outlet pipe segment, and the coolant-chamber end of the outlet pipe segment (22) is spaced apart from the baffle at another point along the circumference of the coolant-chamber end of the outlet pipe segment.

* * * * *